No. 688,208. Patented Dec. 3, 1901.
N. R. STREETER.
TWINE HOLDER.
(Application filed Jan. 16, 1901.)
(No Model.)
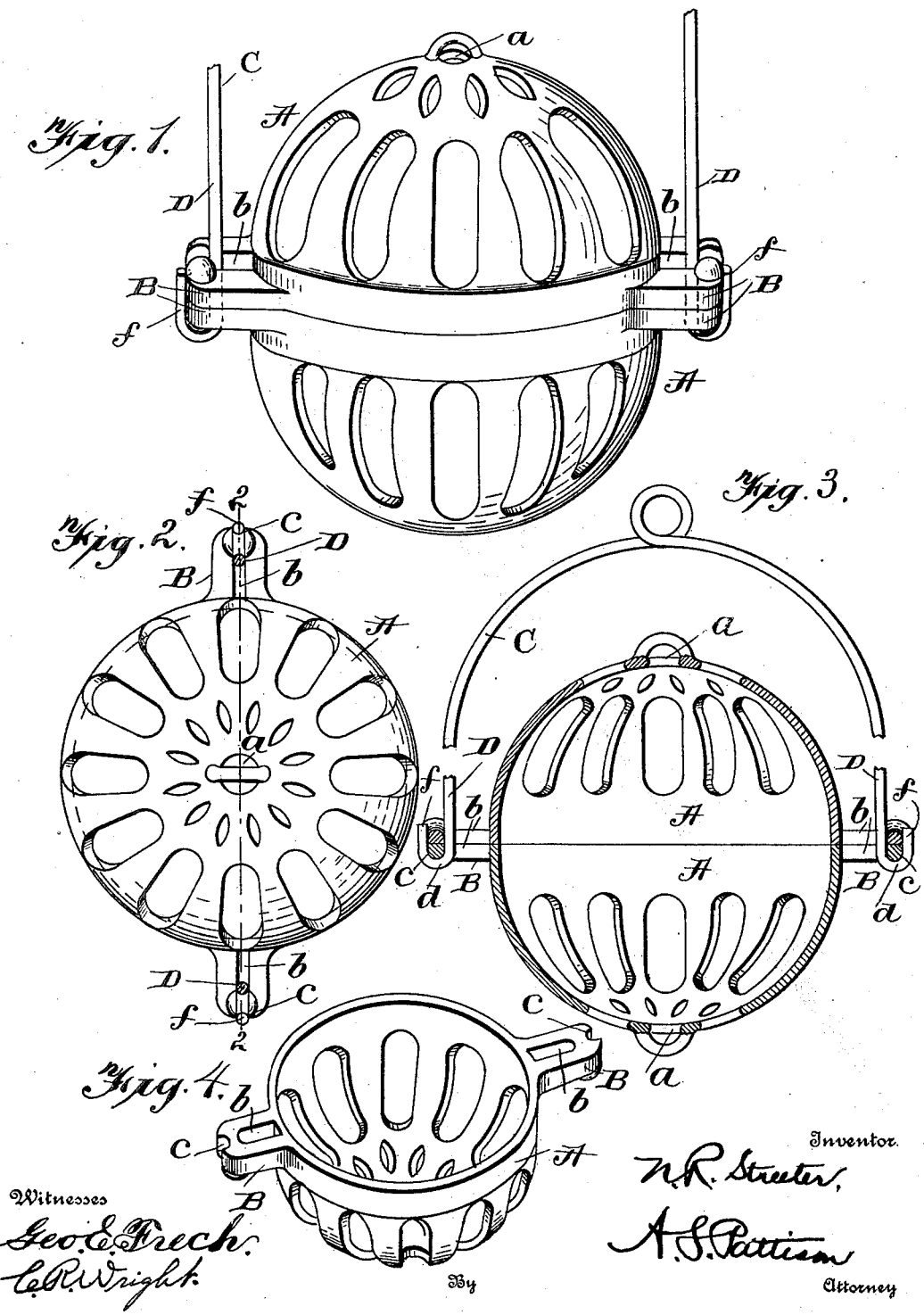
Witnesses
Geo. E. Frech.
C. R. Wright.
Inventor
N. R. Streeter,
By A. S. Pattison
Attorney
THE NORRIS PETERS CO., PHOTO-LITHO., WASHINGTON, D. C.

UNITED STATES PATENT OFFICE.

NELSON R. STREETER, OF SYRACUSE, NEW YORK.

TWINE-HOLDER.

SPECIFICATION forming part of Letters Patent No. 688,208, dated December 3, 1901.

Application filed January 16, 1901. Serial No. 43,556. (No model.)

*To all whom it may concern:*

Be it known that I, NELSON R. STREETER, a citizen of the United States, residing at Syracuse, in the county of Onondaga and State of New York, have invented new and useful Improvements in Twine-Holders, of which the following is a specification.

My invention relates to improvements in twine-holders, and pertains more particularly to that class which is supported from the ceiling above the counter.

The object of my invention is to provide a cheap, simple, and durable twine-holder in which the twine can be readily inserted or removed without removing it from its place of support.

Another object of my invention is to provide a twine-holder made in two sections exactly alike and held together by a supporting-bail which can be readily detached, allowing the two sections to be separated, and thus saving a great amount of space in the packing and shipping thereof.

In the accompanying drawings, Figure 1 is a perspective view showing the device ready for use. Fig. 2 is a top plan view. Fig. 3 is a cross-sectional view taken on line 2 2 of Fig. 2. Fig. 4 is a detached perspective view of one of the sections.

Referring now to the drawings, my invention consists of two hollow semispherical sections A A, which can be either solid or network, but preferably as shown in the drawings. The two sections are made exactly alike, each section having an opening $a$, through which the cord is adapted to pass, and thus there is no top or bottom section, as either may be used as readily for one as the other. Thus whichever way the sections are used there will be an opening in the bottom to allow the cord to pass therethrough. The said sections are provided at opposite sides with outwardly-extending ears B, which are provided with longitudinally-extending elongated openings or slots $b$, and the outer ends of said ears are provided with vertically-extending grooves or notches $c$.

A U-shaped supporting-bail is provided with a loop C at its upper portion, by means of which said bail is secured or suspended from the ceiling or other support. The lower free ends D of the said bail are provided with heads, which in the drawings are shown as hooks $d$, said hooks being of a width less than the length of the slots, so that they may pass freely therethrough, and the upwardly-extending portions rest within the recess $c$ in the outer ends of the ears. The hooks are preferably U-shaped, as shown in the drawings, although any shape may be used. The outer free upwardly-extending portions $f$ of the U-shaped hook may have their extreme ends slightly bent inwardly, so as to firmly slip over the ear of the upper section and to hold the two sections together against ordinary pressure arising from the cord not freely unwinding.

By the above construction it will be readily seen that the upper and lower sections are exactly alike, and it makes no difference which is placed on top or bottom. The bail being of a spring metal and the eyes of a length greater than the width of the U-shaped hooks, said hooks are pressed together and passed through the ears of both sections on their respective sides. After they have passed therethrough and are released the spring of the bail will bring it in contact with the outer wall of the slots, and upon being drawn upwardly the free end thereof enters the grooves or notches in the outer faces of the ears, and thus firmly clamps the two sections together. When it is desired to insert a new ball of twine, the upper section is simply moved vertically on the U-shaped bail, thus making the twine more easily inserted.

Having thus fully described my invention, what I claim, and desire to secure by Letters Patent, is—

1. A twine-holder comprising an upper and lower section having openings oppositely arranged and a detachable bail passing through said openings and securing the sections together, substantially as described.

2. A twine-holder comprising an upper and lower section, lateral extensions carried by said sections and having openings therein, and a detachable spring-bail passing through said openings and securing the sections together, substantially as described.

3. A twine-holder comprising an upper and a lower section, ears carried by said sections on either side and having elongated openings, and a detachable bail passing through said openings and securing the sections together, substantially as described.

4. A twine-holder comprising an upper and a lower section, ears carried by said sections and having elongated openings and a detachable spring-bail having headed ends adapted to pass through said openings and supporting the said sections, substantially as described.

5. A twine-holder comprising an upper and lower section, ears carried thereby having elongated openings therein, a spring-bail having U-shaped lower ends passing therethrough and engaging the outer ends of the ears, substantially as described.

6. A twine-holder comprising an upper and lower section, ears carried thereby having elongated openings therein and recessed outer ends, a spring-bail having U-shaped lower ends passing through the slots and resting in the notches in the outer ends of the ears, substantially as described.

In testimony whereof I have hereunto set my hand in the presence of two subscribing witnesses.

NELSON R. STREETER.

Witnesses:
ARLYNUE S. MATHEWS,
IRWIN L. TUCKER.